M. J. MADISON.
RAIL BOLT.
APPLICATION FILED JAN. 14, 1920.
Patented Apr. 20, 1920.
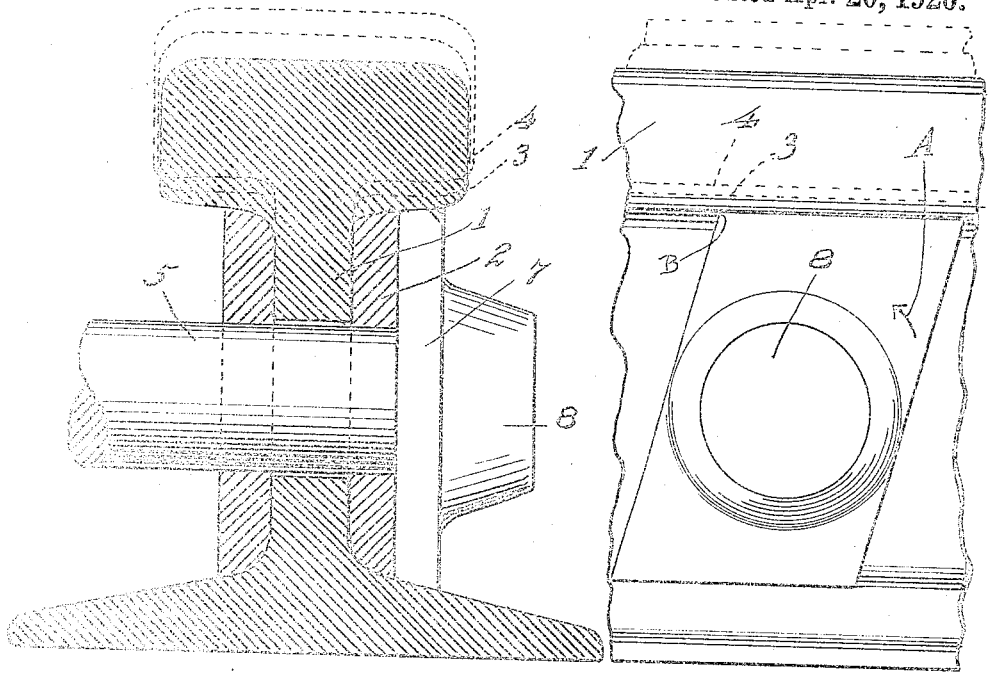
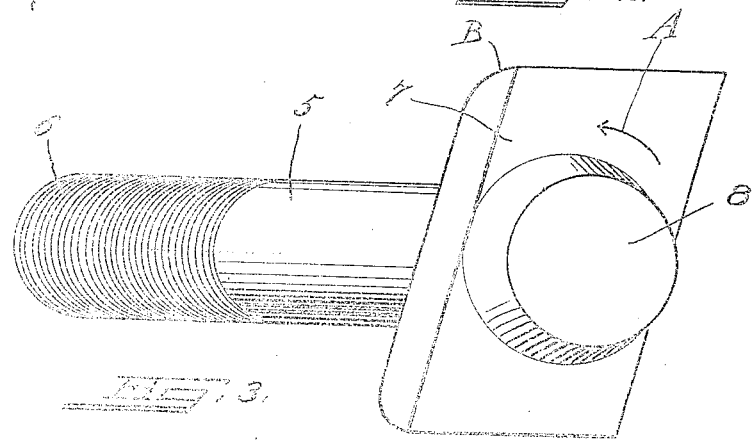
Inventor:
Mart J. Madison
By Allen & Allen
Attorneys.

UNITED STATES PATENT OFFICE.

MART J. MADISON, OF NORWOOD, OHIO, ASSIGNOR TO WEIR FROG COMPANY, OF NORWOOD, OHIO, A CORPORATION OF OHIO.

RAIL-BOLT.

1,337,365.

Specification of Letters Patent.

Patented Apr. 20, 1920.

Application filed January 14, 1920. Serial No. 351,465.

*To all whom it may concern:*

Be it known that I, MART J. MADISON, citizen of the United States, and resident of Norwood, Hamilton county, Ohio, have invented certain new and useful Improvements in Rail-Bolts, of which the following is a full, clear, and exact description, reference being had to the accompanying drawings, forming a part of this specification.

My invention relates to bolts for securing fish plates to railroad rails or in a wide variety of uses in connection with flanged rails and frog structures in railroad practice, my object being to provide a novel flanged head for such bolts.

I am aware that there are bolts on the market for railroad practice which have flanged heads to fit between the flanges of rails and against the webs thereof, or some structure placed against the webs, but to my knowledge the types of such bolts in use do not fully provide for the necessary functions.

Thus a rectangular shaped head or flange for a bolt will frequently find a bearing beneath the head or ball of a rail at one edge or corner thereof, because of unevenness of the rail, and because of the width of the space between the rail head and base.

A considerable degree of looseness resulting from a rectangular bolt flange being too small will permit the head to turn with the resultant dangerous condition of looseness in the rail joint frog or what not, due to the fact that the radial line from the center of the bolt to the two corners of the flange will be equal, so that if one corner will pass, the other will do so also.

According to my invention, however, the bolt head flange is shaped as a non-rectangular parallelogram, thereby providing for a greater length of the line of contact of the flange of the bolt with the rail head and base, and also providing for a flange which can not turn more than half a revolution if it becomes loose at one corner. Such a structure also provides for a flange which will have a fast engagement in rails which are considerably larger size than the rails for which the particular bolts were designed.

I accomplish my object by that certain construction and arrangement of parts to be hereinafter more specifically pointed out and claimed.

In the drawings,

Figure 1 is a side elevation illustrating the bolt in use with a rail, with oversized rails being shown in dotted lines.

Fig. 2 is a face view of the bolt head in use.

Fig. 3 is a perspective view of the bolt.

The bolt is shown as employed for securing rails at the joints by means of a fish plate. This is, of course, not the only use to which my invention may be put, as will be obvious to those skilled in the art.

The rail is indicated at 1, and the fish plate at 2, there being dotted lines showing larger sized rails at 3 and 4—(Fig. 1.)

The bolt has a shank 5, with a threaded end 6 of any desired character, and near the head the bolt is provided with a wide parallelogram shaped portion 7, having considerably more length than width, and non-rectangular in form. The head 8 of the bolt is formed on the outside of the flange or parallelogram portion, which makes for a convenient method of manufacture, and furthermore, enables me to present a flat surface to devices held against the webs of rails by means of the bolt flanges.

When set against the side of a rail, the flange of the bolt will lie with its short dimension abutting along the head and base of the rail in such a way as to bring that portion of the flange which is a greater radial distance from the center of the bolt very firmly against the said base and head. The nuts when turned up on the bolts tend to twist the heads in the direction indicated by the arrow A.

Great force is applied to the tightening up of rail bolts, and if a mere corner was in contact with the head and base of the rail, this corner, or corners, would tend to be burred over by the twisting strain.

As is further evident, even if the corners of the flange nearest the bolt center were not in contact at all with the head and base of the rail, still the projecting portions of the flange would be. Moreover, should excessive looseness of the bolt cause it to turn on its axis in a direction opposite to the arrow A, then although the corners B on the short radius of the flange would possibly turn freely, still after a half or partial turn had taken place the corners on the long radius would come into fast contact, and stop the bolt head from turning further.

Having thus described my invention, what I claim as new and desire to secure by Letters Patent is,—

1. A rail bolt comprising a shank and a flanged portion rigid with the shank, and having a flat contact face, said face not being at a right angle to the radial line through the bolt bisecting said face.

2. A rail bolt comprising a shank and a flanged portion rigid with the shank and having the shape of a non-rectangular parallelogram, for the purpose described.

3. A rail bolt comprising a shank, a flanged portion integral with the shank, and a bolt head, said flanged portion lying between the bolt head and the shank, and said flanged portion having flat contact faces, with the faces disposed at other than a right angle from the radial line through the bolt bisecting said faces.

4. A rail bolt comprising a shank, a flanged portion integral with the shank and a bolt head, said flanged portion lying between the bolt head and the shank, and said flanged portion being shaped as an elongated and non-rectangular parallelogram, for the purpose described.

MART J. MADISON.